US006706863B2

(12) United States Patent
Hashimoto et al.

(10) Patent No.: US 6,706,863 B2
(45) Date of Patent: Mar. 16, 2004

(54) ORGANIC PIGMENT WITH HIGH TRANSPARENCY AND HYDROPHOBICITY

(75) Inventors: Isao Hashimoto, Shizuoka (JP); Noboru Tsuda, Shizuoka (JP); Hiroshi Ohsawa, Shizuoka (JP); Tomonori Okazaki, Shizuoka (JP); Manabu Shiga, Shizuoka (JP); Kohei Ohtsuki, Shizuoka (JP)

(73) Assignee: Clariant Finance (BVI) Limited, Tortola (VG)

( * ) Notice: Subject to any disclaimer, the term of this patent is extended or adjusted under 35 U.S.C. 154(b) by 2 days.

(21) Appl. No.: 10/204,012

(22) PCT Filed: Dec. 21, 2001

(86) PCT No.: PCT/JP01/11253

§ 371 (c)(1),
(2), (4) Date: Aug. 15, 2002

(87) PCT Pub. No.: WO02/051943

PCT Pub. Date: Jul. 4, 2002

(65) Prior Publication Data

US 2003/0040559 A1 Feb. 27, 2003

(30) Foreign Application Priority Data

Dec. 22, 2000 (JP) ...................................... 2000-389814

(51) Int. Cl.$^7$ ......................... C09B 35/22; C09B 41/00; G03G 9/09; C09D 11/02; G02B 5/22

(52) U.S. Cl. ...................... 534/742; 534/581; 106/31.5; 349/106; 430/108.23; 524/105

(58) Field of Search ................................ 534/581, 742; 106/31.5; 430/108.23; 349/106; 524/105

(56) References Cited

U.S. PATENT DOCUMENTS

| | | | | | |
|---|---|---|---|---|---|
| 4,870,164 | A | | 9/1989 | Kuhne et al. | 534/742 |
| 4,935,502 | A | * | 6/1990 | Kuhne et al. | 534/742 |
| 6,022,659 | A | * | 2/2000 | Kanbayashi et al. | 430/108.23 |
| 6,028,178 | A | | 2/2000 | Metz et al. | 534/581 |
| 6,120,957 | A | * | 9/2000 | Miyamoto et al. | 430/108.21 |
| 6,168,895 | B1 | * | 1/2001 | Metz et al. | 430/108.23 |
| 6,187,495 | B1 | * | 2/2001 | Chiba et al. | 430/108.23 |

OTHER PUBLICATIONS

English abstract for JP 06–230607, Aug. 19, 1994, Mochizuki, et al.

English abstract for JP 06–266163, Sep. 22, 1994, Yamamota.

* cited by examiner

*Primary Examiner*—Fiona Powers
(74) *Attorney, Agent, or Firm*—Anthony A. Bisulca

(57) ABSTRACT

The present invention provides Pigment Yellow 180 having an excellent transparency produced by using a fine slurry of 5-acetoacetylamino-benzimidazolone as a coupling component when Pigment Yellow 180 is produced by coupling reaction of 5-acetoacetylamino-benzimidazolone and diazo component obtained by diazotization of 1,2-bis(2-aminophenoxy)ethane.

8 Claims, No Drawings

ORGANIC PIGMENT WITH HIGH TRANSPARENCY AND HYDROPHOBICITY

Pigment Yellow 180 is a benzimidazolone pigment which is widely used in the fields of printing ink, plastics, dope dyeing of polypropylene etc., toner, and the like.

However as Pigment Yellow 180 has insufficient transparency in spite of having the advantages of high heat resistant property and of having no chlorine in its structure, the condensation azo pigment and isoindolinone pigment which are yellow pigment having the same color region as Pigment Yellow 180 are often used in the field of color filter where a higher transparency is required.

Further, as Pigment Yellow 180 so far applied is hydrophilic, it could not be applied in the field where the hydrophobic property is desired.

Pigment Yellow 180 is disclosed in Japanese Examined Patent Publication No. Hei 2-37949. It describes that Pigment Yellow 180 is suitable for coloring organic polymer materials such as polyolefins like polypropylene, etc., and polyvinyl chloride. And yellow toner using Pigment Yellow 180 and its production method are disclosed in Japanese Laid-open Patent Publication Nos. Hei 6-230607 and Hei 6-266163. However in these publications there is no description on the means improving a transparency and the applications utilizing it.

On the other hand the method of improving a transparency of Pigment Yellow 180 by conducting azo-coupling at low temperature and in relatively short time and the method of using the pigment obtained thereby as a pigment for an electrophotographic toner and developer are disclosed in Japanese Laid-open Patent Publication No. Hei 8-209017.

However the transparency which is achieved by the method described in Japanese laid-open Patent Publication No. Hei 8-209017 is not one that is satisfied completely and further improvement is desired. Furthermore there is no description of the means therein to increase the hydrophobic property of Pigment Yellow 180.

Considering the above situation, the present invention has a purpose to offer Pigment Yellow 180 with a high transparency required for a color filter provided for liquid crystal display equipment and for a color toner provided for a copying machine and a printing machine, and the production method thereof.

Further the present invention has a purpose to offer Pigment Yellow 180 with the above transparency and a high hydrophobic property in the same time and the production method thereof.

Furthermore the present invention has a purpose to offer a various kind of materials containing above-described Pigment Yellow 180 as a colorant.

After being dedicated to research and examine, the present inventors have found that Pigment Yellow 180 with a high transparency and a small particle size can be produced by conducting a preparation of a coupling component at relatively low temperature and slowly in the production process of said pigment to prevent coagulation of the pigment and furthermore Pigment Yellow 180 with high hydrophobic property in addition to a high transparency can be produced by treating a surface of the above-described pigment.

Therefore the present invention relates to Pigment Yellow 180 represented by the following formula and the production method thereof, which is improved the transparency by −2 or less of dL value which is obtained by comparing the brightness measured by a spectrophotometer with that of the control product.

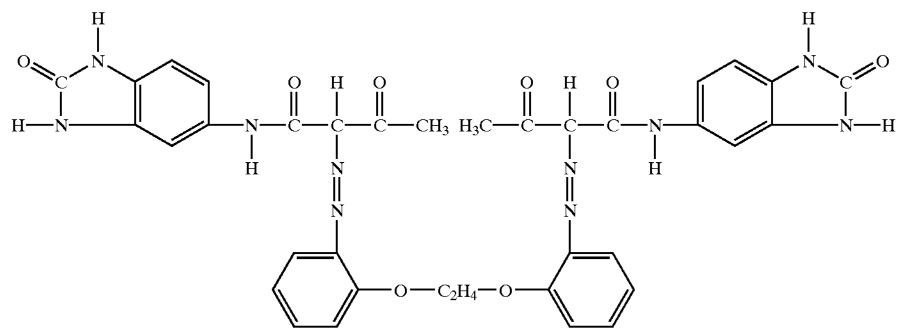

The above described limit of dL value which corresponds to a scale of transparency is determined by deducting L value which is measured of the control product that is PV Fast Yellow HG or Novoperm Yellow P-HG (Both are the pigments which belong to Pigment Yellow 180.) which are the commercial products and are supplied by Clariant Japan K.K. by the testing method in the Comparative Examples 1 to 3 described below, from L value which is measured of Pigment Yellow 180 that is produced by the way described in the present invention by the same testing method as described above. As described in the Comparative Example 1 later, the higher the absolute value of dL value is, the larger the difference of transparency is and the dL value of Pigment Yellow 180 according to the present invention is usually −2 or less and one with particularly high transparency is −3 or less.

The production method for Pigment Yellow 180 having improved transparency according to the present invention is characterized in that 1,2-bis(2-aminophenoxy)ethane is diazotized with sodium nitrite and a fine slurry of 5-acetoacetylamino-benzimidazolone is used as a coupling component when the generated product by diazotization reaction is made a coupling with 5-acetoacetylamino-benzimidazolone in accordance with the publicly known methods such as the methods described in Japanese Examined Patent Publication No. Hei 2-37949 or Japanese Laid-open Patent Publication No. Hei 8-209017, for example.

The fine slurry can be prepared, when preparing a slurry of 5-acetoacetylamino-benzimidazolone, for example, by adding an organic acid such as acetic acid, by adding such organic acid at lower temperature such as 10° C. or below and more slowly such as taking 5 minutes to 1 hour, preferably 15 minutes or longer than so far applied.

It means that the particle size of the slurry expressed by "fine" shows the comparable degree of fineness with the particle size of the slurry obtained by the above method raised as an example not depending on the means actually taken and that it has finer particle size than that which is prepared by the ordinary method wherein the addition of an organic acid is conducted at higher temperature than the slurry preparation condition described above and at the ordinary adding speed. And at this moment a nonionic surfactant can be added such as dimethylcocoalkylamine oxide which is described in the example of Japanese Laid-open patent Publication No. Hei 8-209017, polyglycol ether of aliphatic alcohol or phosphoric ester. By this the stabilization of a particle and a flowability of slurry are provided. On the other hand since a transparency and a hydrophobic property are prevented by addition of such surfactants, it is preferred to add no surfactant or not so much, for example 6 weight parts or less, if added, relative to the weight of benzimidazolone.

To be surprised, by preparing such fine slurry and by using it as a coupling component, a high transparency can be given to Pigment Yellow 180 having L value of usually 50 or less based on the measured values described in the Comparative Example 1 wherein a polyvinyl chloride compound is used as a resin, preferably 48 or less, further preferably 46 to 40, which has not been achieved by the prior art as shown in the Examples or Comparative Examples below.

This invention further relates to Pigment Yellow 180, to which such a high hydrophobic property is given as the sedimentation time in hydrophobic property test by sedimentation method in water takes 1 hour or more in addition to the above transparency and a production method thereof.

This sedimentation time which is a scale of hydrophobic property is determined by the method which is described in the Comparative Example 5 below.

Such high hydrophobic property can be achieved by surface treatment of a pigment using a wax. This surface treatment is conducted generally either by the method wherein the synthesized pigment is mixed with wax emulsion continuously, and then the emulsion is destructed by heat to coat on the surface of aforementioned pigment with the wax, or by the method wherein after the above described coupling reaction is completed, it is dispersed in slurry form by adding water and organic solvent such like isobutanol thereto in an autoclave, and then mixed with wax emulsion and the emulsion is destructed by heat to coat on the surface of aforementioned pigment with the wax.

The waxes used for the above described surface treatment may not be limited to their kind if emulsification is possible, however for instance fatty acid and fatty acid ester type of waxes such as a montan wax and a carnauba wax with drop point 70–165° C., amide waxes such as ethylene-bis-stearyl amide, fatty acid monoamide, olefinic waxes such as polyethylene, oxidized polyethylene, polypropylene, oxidized polypropylene can be exemplified. Preferably a montan wax, ethylene-bis-stearyl amide and an oxidized polypropylene wax are used.

The emulsions of waxes raised above are commercially available and they can be used as they are. A preparation of wax emulsion can be made as follows, for example.

1. Preparation of a montan wax emulsion

A free carboxyl group of montan wax is neutralized or saponified with a basic compound such like an aqueous ammonia solution and is emulsified in high pressure homogenizer.

2. Preparation of an amide wax emulsion

Fine powder of amide wax is emulsified with small amount of surfactant such like polyoxyethylene oleyl ether (nonionic active agent), alkyldiphenyl ether sodium disulphonate (anionic active agent) and a thickener such like xanthane gum in a dispersing vessel at high speed rotation.

3. Preparation of an oxidized polyethylene wax emulsion

An oxidized polyethylene wax is emulsified by using a surfactant such like polyoxyethylene stearyl ether and a basic compound such like a potassium hydroxide in an autoclave at high temperature and high pressure.

Pigment Yellow 180 of the present invention is used for a colorant for a various kind of applications such as printing ink, paint, plastics, rubber, full-color-toner for a copying machine or a printer, color filter for liquid crystal display equipment. It is used particularly preferably for a colorant for transparent resins such as polyester resin, polyvinyl chloride resin, polypropylene resin, polycarbonate resin, acrylic resin, polystyrene resin, styrene-acrylic resin, etc., a yellow colorant for a full-color-toner for a copying machine or a printer, a color filter for liquid crystal display equipment, etc.

Thus this invention relates to printing ink, inkjet ink, paint, plastics, rubber, a full-color-toner for a copying machine or a printer, a color filter for liquid crystal display equipment, as well.

This invention is described below further in details by raising Examples, however this invention is not limited to those Examples.

EXAMPLES

Example 1

345 g of 1,2-bis(2-aminophenoxy)ethane was added into 4,500 ml of water, and then 654 ml of 35%-hydrochloric acid was added thereto. The resultant solution was stirred for 15 minutes.

After chilling by adding ice, 423 ml of 38%-sodium nitrite aqueous solution was dropped into the solution to diazotize 1,2-bis(2-aminophenoxy)ethane. After absorbing impurities with an active carbon, etc., the solution was filtered.

On the other hand, 750 g of 5-acetoacetylamino-benzimidazolone was added into 6,000 ml of water, it was stirred for 10 minutes and the temperature of the solution was made to 20–25° C.

880 ml of aqueous sodium hydroxide (29%) was added thereto and was filtered after stirring for 10 minutes.

The filtrate was made to be 12,000 ml with water and ice, and then 676 ml of acetic acid (80%) was added thereto at 5° C. taking for 20 minutes to form a slurry.

This coupling component and aforementioned diazo component were made coupling at 27° C. taking for 5 hours to synthesize Pigment Yellow 180.

435 g of emulsion of a montan wax (solid content 23%) was added thereto, then the slurry was heated up to 90° C. by introduction of steam and the temperature was kept for about 15 minutes or more.

After cooling, this slurry was filtered and was washed.

The obtained press-cake was removed into an autoclave and was made a homogeneous slurry by adding 4,000 ml of water.

6,000 ml of isobutanol was added to the slurry and the slurry was heated at 80° C. or higher for more than 2 hours.

After cooling, isobutanol was collected from the slurry by using a reflux condenser. Then the slurry was filtered with a filter-press, washed with water, dried up at a normal pressure at 100° C., and milled by an air-jet-mill to obtain approximately 1,100 g of Pigment Yellow 180.

Example 2

The coupling was conducted in the same manner as Example 1. The reaction solution was heated up to 90° C. and was kept at this temperature for more than 15 minutes.

The slurry was cooled down, it was filtered and washed. The press-cake obtained was removed into an autoclave, and 4,000 ml of water and 6,000 ml of isobutanol were added thereto to form a homogenous slurry.

500 g of amide wax emulsion (solid content 20%) was added to the slurry. Then it was heated up at the temperature of 80° C. or higher and was kept at this temperature for more than 2 hours.

After cooling, isobutanol was collected from the slurry. Then the slurry was filtered, washed, dried up and milled to obtain approximately 1,100 g of Pigment Yellow 180.

Example 3

The coupling was conducted in the same manner as Example 1, the reaction solution was heated up to 90° C. and was kept at this temperature for more than 15 minutes.

This slurry was cooled down, filtrated and washed. The press-cake obtained was removed into an autoclave, and 4,000 ml of water and 6,000 ml of isobutanol were added thereto to form a homogenous slurry.

322 g of oxidized polyethylene wax emulsion (solid content 31%) was added to the slurry and it was heated up at the temperature of 80° C. or higher and was kept at this temperature for more than 2 hours.

After cooling, isobutanol was collected from the slurry. Then the slurry was filtered, washed, dried up and milled to obtain approximately 1,100 g of Pigment Yellow 180.

Comparison with Pigment Yellow 180 so far Applied

Comparative Example 1

Comparison in Polyvinyl Chloride

Each 0.1 g of the pigments of the present invention which were obtained according to Examples 1, 2 and 3 and the conventional product (PV Fast Yellow HG produced by Clariant company) was taken by measuring its weight. It was mixed respectively with 100 g of soft polyvinyl chloride compound (30% of plasticizer was contained). After kneaded at 130° C. for 7 minutes by two-roll-mill, sheets with 1 mm thickness were formed by press machine. In order to measure a transparency of these specimens easily, each reflectivity was measured using black colored cardboard as a background by a spectrophotometer (CS-5 manufactured by Applied Color Systems company) and compared after converting the measured value to L value.

This testing method was a color measurement in accordance with DIN 55988 and is a judgment method by eyes.

In order to measure a transparency of these specimens easily, a paper on which a black belt-like line was printed was used as a background. A difference of brightness measured by a spectrophotometer was converted into dL value and compared.

The relationship between dL value by spectrophotometer and the evaluation in 6 steps by eye judgment is as follows.

| dL value | Judgment by eyes |
|---|---|
| 0.11 to 0.20 | very slightly different |
| 0.21 to 0.50 | slightly different |
| 0.51 to 0.80 | somewhat different |
| 0.81 to 1.41 | different in great degree |
| 1.41 to 2.00 | apparently different |
| 2.01 or higher | remarkably different |

By this method, L values for the conventional product and the products of this invention (Examples 1, 2 and 3) are compared to give the following results.

TABLE 1

| | Conventional Product | Example 1 | Example 2 | Example 3 |
|---|---|---|---|---|
| L value | 50.15 | 43.90 | 45.20 | 44.93 |
| dL value | — | −6.25 | −4.94 | −5.22 |

These results correspond to "remarkably different" by aforementioned judgment method by eyes. It shows the improvement of a transparency.

From the above issues the products of this invention have apparently low L value compared with the conventional product. It means that it was confirmed that the transparency was improved remarkably.

Comparative Example 2

Comparison in Polypropylene

Each 1 g of the pigments of the present invention (Examples 1, 2 and 3)and the conventional product (PV Fast Yellow HG produced by Clariant company) was taken by measuring its weight. They were mixed respectively with 1 g of magnesium stearate and 1 kg of polypropylene resin.

After dispersing the mixed product by a twin screw extruder, molded chips were prepared with 1.3 mm thickness by an injection machine. Each reflectivity was measured with L value by spectrophotometer in the same manner as Comparative Example 1 and the transparency was compared.

TABLE 2

| | Conventional Product | Example 1 | Example 2 | Example 3 |
|---|---|---|---|---|
| L value | 49.36 | 43.73 | 44.14 | 43.94 |
| DL value | — | −5.63 | −5.22 | −5.42 |

These results correspond to "remarkably different" by aforementioned judgment method by eyes. It shows the improvement of a transparency.

By the above results, it was confirmed that the products of this invention have very superior transparency compared with the conventional product in the same manner as Comparative Example 1.

Comparative Example 3

Comparison in PVC/PVAc Gravure Ink

Each 7.5 g of the pigments of the present invention (Examples 1, 2 and 3) and the conventional product (Novoperm Yellow P-HG produced by Clariant company) was taken by measuring its weight. They were mixed respectively with 42.5 g of PVC/PVAc varnish (solid content 16%) and 130 g of glass beads (diameter 1.3 mm) in a 250 ml-polyethylene vessel and were dispersed by using a paint shaker for 1 hour. After dispersing, each mixture was diluted with 50 g of polyvinyl chloride/polyvinyl acetate (hereafter abbreviated as PVC/PVAc) varnish and inks with 7.5% of pigment concentration were prepared.

Each ink was coated on a polyester film by using No. 2 bar coater (wet coated film thickness, 12 microns).

Each reflectivity of these coated polyester films was measured with L value by spectrophotometer in the same manner as Comparative Example 1 and the transparency was compared.

TABLE 3

| | Conventional Product | Example 1 | Example 2 | Example 3 |
|---|---|---|---|---|
| L value | 49.38 | 46.31 | 46.81 | 46.08 |
| DL value | — | −3.07 | −2.57 | −3.30 |

These results correspond to "remarkably different" by aforementioned judgment method by eyes. It shows the improvement of a transparency.

By the above results it was confirmed that the product of this invention has very superior transparency compared with the conventional product for PVC/PVAc gravure ink.

Comparative Example 4

Comparison in Aqueous Flexographic Ink

Each 12.0 g of the pigments of the present invention (Examples 1, 2 and 3) and the conventional product (Novoperm Yellow P-HG produced by Clariant company) was taken by measuring its weight. They were mixed respectively with 57.0 g of alkali-soluble acrylic resin (solid content 20%) and 130 g of glass beads (diameter 1.3 mm) in a 250 ml-polyethylene vessel and were dispersed by using a paint shaker for 1 hour. After dispersing, each mixture was further diluted with 20 g of acryl emulsion varnish, 6 g of water and 5 g of isopropyl alcohol and inks with 12.0% of pigment concentration were prepared.

Each ink was coated on a polyester film by using No. 1 bar coater (wet coated film thickness, 6 microns).

Each reflectivity of these coated polyester films was measured with L value by spectrophotometer in the same manner as Comparative Example 1 and the transparency was compared.

TABLE 4

| | Conventional Product | Example 1 | Example 2 | Example 3 |
|---|---|---|---|---|
| L value | 51.05 | 47.10 | 47.67 | 47.68 |
| DL value | — | −3.95 | −3.38 | −3.37 |

These results correspond to "remarkably different" by aforementioned judgment method by eyes. It shows the improvement of a transparency.

By the above results it was confirmed that the products of this invention have very superior transparency compared with the conventional product in aqueous flexographic ink.

Comparative Example 5

Comparison of Hydrophobic Property of the Pigment

Each 1 g of the pigments of the present invention (Examples 1, 2 and 3) and the conventional product (Toner Yellow HG produced by Clariant company) was taken by measuring its weight, each pigment was put into 100 ml of a distilled water in a 250 ml-beaker and was made floated and the time required for all 1 g of the pigment to be precipitated was measured.

The following results were observed.

TABLE 5

| | Conventional Product | Example 1 | Example 2 | Example 3 |
|---|---|---|---|---|
| Time until sedimentation | 15 seconds | More than 500 hours | More than 500 hours | 1 hour |

From the results above it was confirmed that the products of the present invention had remarkably higher hydrophobic property than the conventional product.

As mentioned above, a transparency and a hydrophobic property of Pigment Yellow 180 so far applied are improved remarkably by this invention and it has become possible to apply Pigment Yellow 180 for the field where particularly high transparency is required such as a color toner and a color filter and the field where a hydrophobic property is required such as a polymerization toner.

Pigment Yellow 180 which was obtained by this invention can be applied for a colorant for the fields such as printing ink, inkjet ink, paint, plastics, rubber, a full-color-toner for a copying machine or a printer, or a color filter for liquid crystal display equipment, etc.

What is claimed is:

1. Pigment Yellow 180,transparency of −2 or less of dL value, wherein the dL value is obtained by comparing brightness, measured by spectrophotometer, of the Pigment Yellow 180 with that of a control product.

2. Pigment Yellow 180 according to claim 1, having a sedimentation time of one hour or longer in a water-sedimentation hydrophobic property test.

3. A method for producing Pigment Yellow 180 comprising the steps of diazotizing 1,2-bis(2-aminophenoxy)ethane to obtain diazo component, and coupling the diazo component with a fine slurry of 5-acetoacetylamino-benzimidazolone to form the Pigment Yellow 180.

4. A method according to claim 3, further comprising surface treating the Pigment Yellow 180 with a wax.

5. A composition comprising the Pigment Yellow 180 as claimed in claim 1, wherein the composition is selected from the group consisting of a printing ink, inkjet ink, paint, plastic, rubber, full color toner for a copying machine and a printer or color filter for a liquid crystal display.

6. The method of claim 3, wherein in the Pigment Yellow 180 has a transparency of −2 or less of the dL value, wherein the dL value is obtained by comparing brightness, measured by spectrophotometer of the Pigment Yellow 180 with that of a control product.

7. A Pigment Yellow 180 made in accordance with the method of claim 3.

8. A composition comprising the Pigment Yellow 180 as claimed in claim 7, wherein the composition is selected from the group consisting of a printing ink, inkjet ink, paint, plastic, rubber, full color toner for a copying machine and a printer or color filter for a liquid crystal display.

* * * * *